Oct. 21, 1930.  R. T. CAMERON  1,778,792
COFFEE PERCOLATOR
Filed Feb. 17, 1930
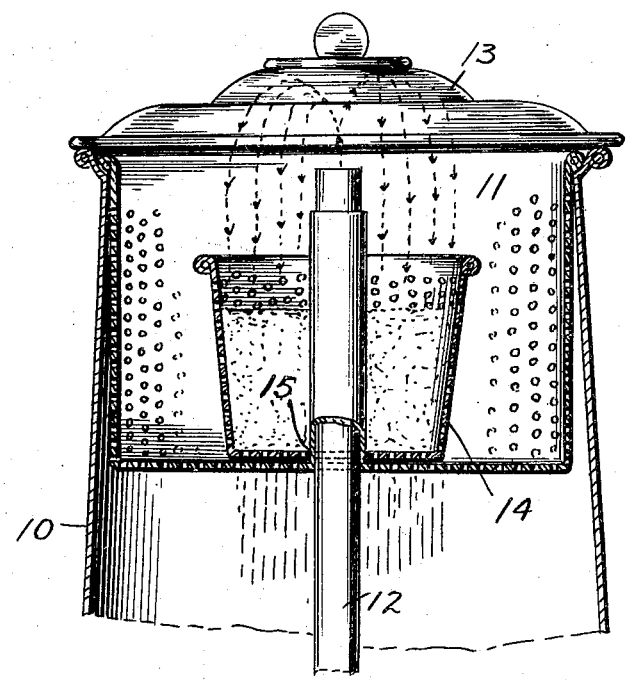
Inventor
Robert T. Cameron
By Chas. J. Williamson
Attorney Patented Oct. 21, 1930

1,778,792

UNITED STATES PATENT OFFICE

ROBERT T. CAMERON, OF MEMPHIS, TENNESSEE

COFFEE PERCOLATOR

Application filed February 17, 1930. Serial No. 429,114.

The ordinary coffee percolator is wasteful of coffee and otherwise inefficient because the ground coffee capacity of the perforated cup is much greater than the ordinary requirements. This results in considerable quantity of ground coffee being beyond the reach of the descending streams of leaching water, and thus is not utilized. The object of my invention is to remedy this and to do so by means at once simple and inexpensive and which will enable the full capacity of the large capacity percolator to be utilized, when desired. An important feature of my invention is that it involves no structural alteration whatever in the ordinary percolator on the market today.

My invention consists in whatever is described by or is included within the terms or scope of the appended claims.

In the drawings:—

The figure is a vertical section of a coffee percolator embodying my invention.

The percolator shown is of the ordinary construction that includes a pot, 10; strainer or drip cup, 11; a vertical hot water ascending tube, 12, which reaches from the pot bottom to the top; and the water distributing dome, 13, usually of glass which receives water issuing from the tube top and causes it to fall in drops or streams upon coffee in the strainer cup, 11.

The cup, 11, if of a diameter to make four cups of coffee is so large that if ground coffee of a quantity to make only two cups is placed therein and reaches to the side walls of the strainer cup, the depth of grounds will be small and large portions of the grounds towards the cup walls will not receive and be penetrated by falling drops or streams of water and by reason of the diminished depth of the grounds the leaching action of the water will be inefficient because it will flow so readily through the ground coffee.

To enable a smaller quantity of ground coffee to be used and to present the same with considerable depth and close to the center so that the coffee grounds will be within the region or zone where the greatest dripping of water takes place I provide a supplemental strainer cup, 14, of considerably less diameter than the strainer cup, 11. The cup, 14, has in its bottom at the center a hole, 15, by which it may be slipped over the vertical tube, 12, concentric with the latter and with the main strainer cup, 11, and just as readily removed. It will be evident that the supplemental cup, 14, will confine the coffee grounds close to the tube, 12, and with considerable depth and within the zone or region where the greatest quantity of drippings descend from the dome, 13.

The supplemental cup, 14, may be left in place when a larger quantity than its capacity is to be used because the larger quantity can be placed in the annular space between the two cups as well as within the supplemental cup, 14.

It will be seen that my percolator is characterized by a strainer cup which is of the diameter of the interior of the coffee pot and which may be termed the main strainer cup and a supplemental strainer cup within and concentric with the main cup and of substantially less diameter than the latter so that an annular space exists between the side walls of the two cups.

What I claim is:—

1. A coffee percolator comprising a pot, a strainer cup of a diameter substantially that of the interior of the coffee pot, a supplemental strainer cup of substantially less diameter than the other and means to cause vertical circulation of water in the coffee pot including a surface above the supplemental strainer cup.

2. A coffee percolator comprising a pot, a strainer cup of a diameter substantially that of the interior of the coffee pot, a supplemental strainer cup of substantially less diameter than the other, a vertical tube passing centrally through both cups open at the top and a drip-producing surface above the upper end of the tube.

In testimony whereof I hereunto affix my signature.

ROBERT T. CAMERON.